United States Patent [19]

Kabe

[11] Patent Number: 5,604,914
[45] Date of Patent: Feb. 18, 1997

[54] COMMUNICATION DEVICE FOR USE WITH A FACTORY AUTOMATION NETWORK HAVING MULTIPLE STATIONS FOR ACCESSING A FACTORY AUTOMATED DEVICE USING ADDRESS VARIABLES SPECIFIC TO THE FACTORY AUTOMATED DEVICE

[75] Inventor: Akiyoshi Kabe, Aichi, Japan

[73] Assignee: Mitsubishi Denki Kabushiki Kaisha, Tokyo, Japan

[21] Appl. No.: 402,327

[22] Filed: Mar. 10, 1995

Related U.S. Application Data

[63] Continuation of Ser. No. 910,794, Jul. 9, 1992, abandoned.

[30] Foreign Application Priority Data

Jul. 10, 1991 [JP] Japan .................................. 3-169848

[51] Int. Cl.⁶ .................................................. G06F 15/00
[52] U.S. Cl. .................... 395/800; 395/200.16; 395/823; 395/825; 364/254.7; 364/255.8; 364/946.2; 364/DIG. 1
[58] Field of Search ................................. 395/800, 325, 395/725, 375, 200.16, 823, 825; 364/DIG. 1, 254.7, 255.8, 946.2, 446–9

[56] References Cited

U.S. PATENT DOCUMENTS

| | | | |
|---|---|---|---|
| 4,831,582 | 5/1989 | Miller et al. | 395/600 |
| 4,855,906 | 8/1989 | Burke | 395/600 |
| 4,901,218 | 2/1990 | Cornwell | 364/131 |
| 4,926,375 | 5/1990 | Mercer et al. | 395/325 |
| 4,943,927 | 7/1990 | Yarita et al. | 364/470 |
| 4,972,367 | 11/1990 | Burke | 395/275 |
| 5,119,318 | 6/1992 | Paradies et al. | 395/61 |
| 5,127,090 | 6/1992 | Ruehle | 395/325 |
| 5,307,346 | 4/1994 | Fieldhouse | 370/85.1 |

FOREIGN PATENT DOCUMENTS

| | | |
|---|---|---|
| 0266784 | 5/1988 | European Pat. Off. . |
| 0299523 | 1/1989 | European Pat. Off. . |
| 2208553 | 4/1989 | United Kingdom . |
| 2239325 | 6/1991 | United Kingdom . |

*Primary Examiner*—Alyssa H. Bowler
*Assistant Examiner*—Dzung C. Nguyen
*Attorney, Agent, or Firm*—Sughrue, Mion, Zinn, Macpeak & Seas

[57] ABSTRACT

In an automated factory environment which uses a plurality of stations, each having a communication device that incorporates the Manufacturing Message Specification (MSS) and is joined with other stations in a network that provides for communication using the Manufacturing Automation Protocol (MAP) communication, a method and apparatus for permitting programmed control of the plurality of stations on the basis of user-defined named variables, rather than specific vendor-defined device addresses is provided. A conversion table that has registered therein a correspondence between the named variable and an address for a specific device is used for control and communication. The table is loaded with appropriate address and named variable information by use of conventional program loading services provided in the MSS standard. The input may be from a remote station, from a management terminal or from a Factory Automation (FA) device.

12 Claims, 8 Drawing Sheets

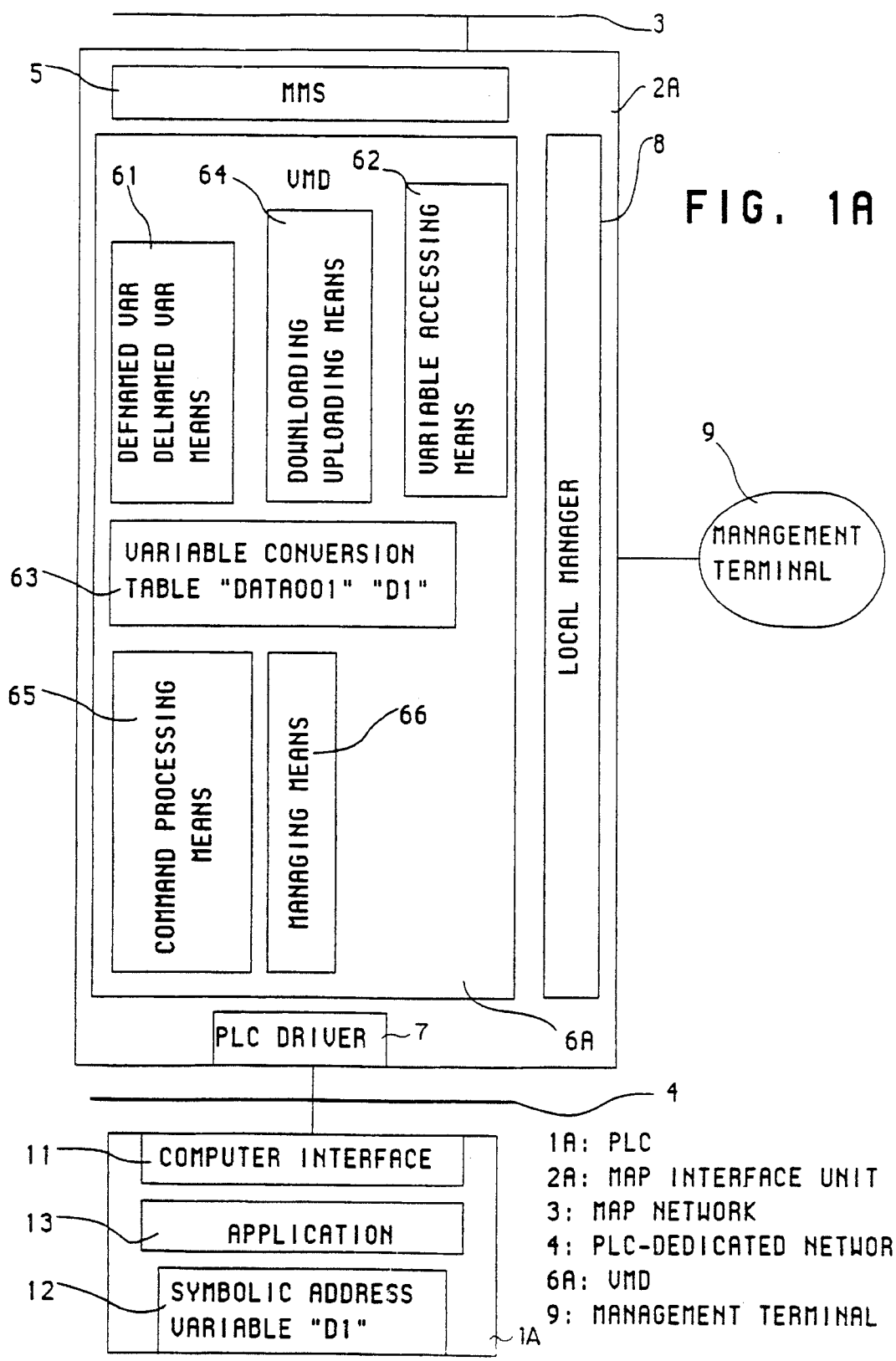

COMMUNICATION DEVICE FOR USE WITH A FACTORY AUTOMATION NETWORK HAVING MULTIPLE STATIONS FOR ACCESSING A FACTORY AUTOMATED DEVICE USING ADDRESS VARIABLES SPECIFIC TO THE FACTORY AUTOMATED DEVICE

This is a continuation of application Ser. No. 07/910,794 filed Jul. 9, 1992, now abandoned.

BACKGROUND OF THE INVENTION

1. Field of the Invention

The present invention relates to a communication device incorporating the MAP (Manufacturing Automation Protocol), an international standard communication protocol that has been defined in ISO Standard ISO/DIS 9506-1, which is useable in a factory automation (FA) environment.

2. Description of the Background Art

In an automated factory, a variety of devices are employed in the manufacturing operation and the devices are joined through a local communication network into a factory system. Since certain devices may be more suitable than others to perform desired manufacturing operations, often the devices used in the factory system will be manufactured by different vendors. Accordingly, each such FA device, whether a factory computer, robot, numerical control (NC) machine, programmable logic controller (PLC), process control equipment, or the like, will have a different type of microprocessor, use different computer languages and execute customized programs. It is desirable that the internal processing and operation of each device should have little effect on the way the devices interact in the factory system and, in particular, how they communicate with each other. In order to provide a common basis for communication, all of the devices in the system must use a common message structure ("syntax") and use a common set of messages or "semantics" (i.e., the naming of and access to remote variables, program loading, job management, error reporting and the like).

The Manufacturing Message Specification (MMS) has been adopted as an international standard that permits programs to be written for a variety of factory system devices on the basis of common semantics and syntax. The MMS is specified in two parts comprising the message services (semantics) and the protocol (syntax). The message services are grouped into functional units that relate to the kinds of functions that are performed when an application (a program that performs some desired job) at one user location interacts with the local communication network for purposes of communicating with a user at another (remote) location. A total of 86 message services may be grouped according to the functions of context management (e.g., Initiate, Conclude, Abort, Reject, Cancel), remote variable services (e.g., Read-data, Write, Define Named Variable, etc.), program services (Initiate Download Sequence for a program, Load Domain Content, etc.), diagnostics (Status, etc.), operator communication (Input and Output), coordination between applications (Define Semaphore, etc.), file services (File Open, File Read, etc.), event management (Define Event Condition, etc.), journal management (Read Journal, Write Journal, etc.) and job management/device control (e.g., Start-robot movement, Stop, Resume, etc.). A detailed description of the MMS standard appears in "MMS Tutorial by John R. Tomlinson, System Integration Specialists Company, Inc. (1987).

FIG. 4A is a block diagram illustrating the connection of two stations, each having corresponding applications and being interconnected by a local communication network, as they would appear in an automated factory environment. The application in station A "at one end" of the network communicates, via a MMS provider (shown as MMS), a logic link controller (LLC), a media access controller (MAC) and a modem at each station that is connected to a local network, with the application in station B "at the other end" of the network. In conventional MMS terminology, for such communication, station A is the "Client" and requests station B as the "Server" to perform some application specific operation; the Server responds with information resulting from the operation as it is performed. Typically, the Client is a controller station and the Server is a FA device.

FIG. 4B is a block diagram illustrating the arrangement of a conventional communication device employing a PLC (Programmable Logic Controller) 1 as an example of an FA (Factory Automation) device. Ordinarily, the PLC has limited storage capability and relies on outside storage media (e.g., disk storage) to store pertinent programming and variables. Reliance on outside storage media has the disadvantage that when a power failure or OFF condition is encountered by the PLC, the relationship between the PLC and its external storage media must be redefined at power ON.

In FIG. 4B, the numeral 2 indicates a MAP interface unit, serving as a communication device and being connected between a MAP network 3 and the PLC 1 via a PLC-dedicated bus 4. The MAP interface 2 comprises an MMS protocol 5 whose communication object is a named variable, rather than an address. A PLC driver 7 for accessing the PLC 1, and a local manager 8 for carrying out management functions also are found in the MAP interface unit 2.

Finally, interface 2 includes a VMD (Virtual Manufacturing Device) 6 for converting the MMS protocol 5 into a protocol reflecting the resources and functionality of the real FA device, e.g., PLC 1 in the preferred embodiment, and performing a process corresponding to each MMS service. The VMD, as an abstract representation of a Server showing its external behavior, comprises four conventional abstract elements including Executive function, Capabilities, Program Invocations and Domains. The latter are dynamic in nature and come into existence and are removed from the system either by MMS Services or by local action. The Domains comprise instructions and/or data which is dedicated to specific resources, such as the portion of the machine or robot that is controlled. Services are provided for a Client to manipulate Domains that are defined at the MMS Server, such as the Initiate Download Sequence and Upload Segment services.

In the standard MMS specification, the Domain management services comprise a Domain Object attribute, which specifies a VMD Object-specific name or Domain Name to uniquely identify the Domain within the VMD, and a List Of Capability attribute, which is a list of implementation specific parameters necessary to partition the resources of the VMD.

The PLC 1 is equipped with a computer interface 11. PLC 1 includes a symbolic address variable registration section 12, and is connected to the MAP network 3 via the dedicated bus 4 and MAP interface unit 2. A controller and multiple FA devices, each representing a different station, may be connected to the MAP network 3 for communication therebetween.

The VMD 6, as a "virtual device" that serves as an abstract model of the MMS server application, provides a consistent basis for defining the MMS services for all devices. In the present case, VMD 6 models the externally visible behavior of the PLC 1 and comprises applications that provide several MMS services and are represented as units, including Define Named Variable/Delete Named Variable means 61 for defining and deleting a named variable convertibly into a symbolic address variable specific to the PLC 1. Also included in VMD 6 is named variable accessing means 62 and a variable conversion table 63 wherein a named variable is registered (stored) in correspondence with a symbolic address variable specific to the FA device.

FIG. 5 is a flowchart showing the operation of the MAP interface unit 2 acting as the communication device known in the art. The operation of the MAP interface unit 2 will now be described in reference to FIG. 5.

Referring to FIG. 5, when a request for a Define Named Variable service is received from a station B at the other end (not shown) that is connected to the MAP network 3 in Step 201, the MMS protocol 5 activates the Define Named Variable/Delete Named Variable means 61 in the VMD 6 in Step 202. As a result, for example, the Define Named Variable/Delete Named Variable means 61 may register a named variable, e.g., "DATA001," into the variable conversion table 63 in correspondence with a symbolic address "D1" according to the request of the other-end station B in Step 203. The named variable is related to a particular FA device, e.g., robot 1, as contrasted to robot 2 which may be represented by named variable "DATA002", and each FA device may be made by any of several vendors. Accordingly, the named variable is identified as having a relationship to a symbolic address, which ordinarily is vendor specific, e.g., Mitsubishi Electric Company of Japan has the standard address D1 and other unique standard addresses are assigned to other vendors. If the request is for a Delete Named Variable service, a corresponding named variable is deleted from the variable conversion table 63.

When a request for a variable access service to the named variable "DATA001" is then received from the other-end station B in Step 204, the MMS protocol 5 activates the named variable accessing means 62 in the VMD 6 in Step 205, the named variable accessing means 62 converts the named variable "DATA001" into the symbolic address "D1" using the variable conversion table 63, and the VMD 6 accesses the symbolic address "D1" of the PLC 1 via the PLC driver 7 in Step 206. By using the table 63 which defines a named variable (e.g., DATA001) to be a vendor specific address (e.g., D1) programming is simplified and is useable for any of several devices from different vendors, since only a data call that is generic to the FA device at a given location (i.e., using DATA001) is used in the program to identify a desired operation, rather than a particular vendor address.

Since the named variable is defined in a procedure as shown in Steps 201 to 203, i.e., when a request for the Define Named Variable service is received from the other-end station B (not shown), the MMS protocol 5 activates the Define Named Variable/Delete Named Variable means 61 in the VMD 6 to cause the Define Named Variable/Delete Named Variable means 61 to register the named variable into the variable conversion table 63 in response to the request of the other-end station B, registration cannot be made from other than the other-end station B. Accordingly, an application concerning a named variable to be registered for the other-end station B must be added for registration.

Several other problems also are encountered in the conventional system design. For example, while a total of 86 services are set forth in the MMS, services which historically experience a low request level may not be provided. In fact, the actually provided services often comprise only about half of the total available services, due to the limited memory capacity in the PLC. For example, the other-end station B often is not provided with the Define Named Variable service or with the Delete Named Variable service. In the absence of these services, the table 63 cannot be utilized effectively, particularly when a power outage or OFF condition is encountered.

Moreover, the known communication device arranged as described above does not allow a user-defined named variable for accessing an FA device to be registered from other than the other-end station. This requires an application for registering the named variable to be added to the other-end station for the purpose of registration.

SUMMARY OF THE INVENTION

It is accordingly an object of the present invention to overcome the disadvantages in the conventional design by providing a communication device which allows a user-defined named variable for accessing an FA device to be registered by a service ordinarily provided for an other-end station or allows the named variable to be registered locally from the FA device or a management terminal in order to avoid the addition of an application to the other-end station.

The first embodiment of the invention achieves a communication device equipped with downloading/uploading means activated by the download service of the MMS protocol for downloading a named variable defined by an other-end station in correspondence with a symbolic address variable specific to an FA device, registering it into a variable conversion table, and uploading to an other-end station the named variable registered into the variable conversion table, whereby the named variable can be registered by a service ordinarily provided for the other-end station and kept stored re-registerable at power-on, offering high practicality.

The second embodiment of the invention achieves a communication device equipped with a management terminal for defining a named variable and requesting it to be registered and with managing means for registering the named variable into a variable conversion table in correspondence with a symbolic address variable specific to an FA device and reading to the management terminal the named variable registered into the variable conversion table, whereby the named variable can be registered locally by the operation of the management terminal and kept stored re-registerable at power-on, ensuring high practicality.

The third embodiment of the invention achieves a communication device whose VMD is equipped with command processing means for registering a named variable defined by an FA device into a variable conversion table in correspondence with a symbolic address variable specific to the FA device in response to a command input from the FA device and reading to the FA device the named variable registered into the variable conversion table, whereby said named variable can be registered locally and kept stored re-registerable at power-on, providing high practicality.

The method of performing the functions of the first, second and third embodiments also is included as features of the invention.

BRIEF DESCRIPTION OF THE DRAWINGS

FIG. 1A is a block diagram outlining the arrangement of a communication device according to the first to third inventions.

DESCRIPTION OF THE PREFERRED EMBODIMENT

Figure 1B:
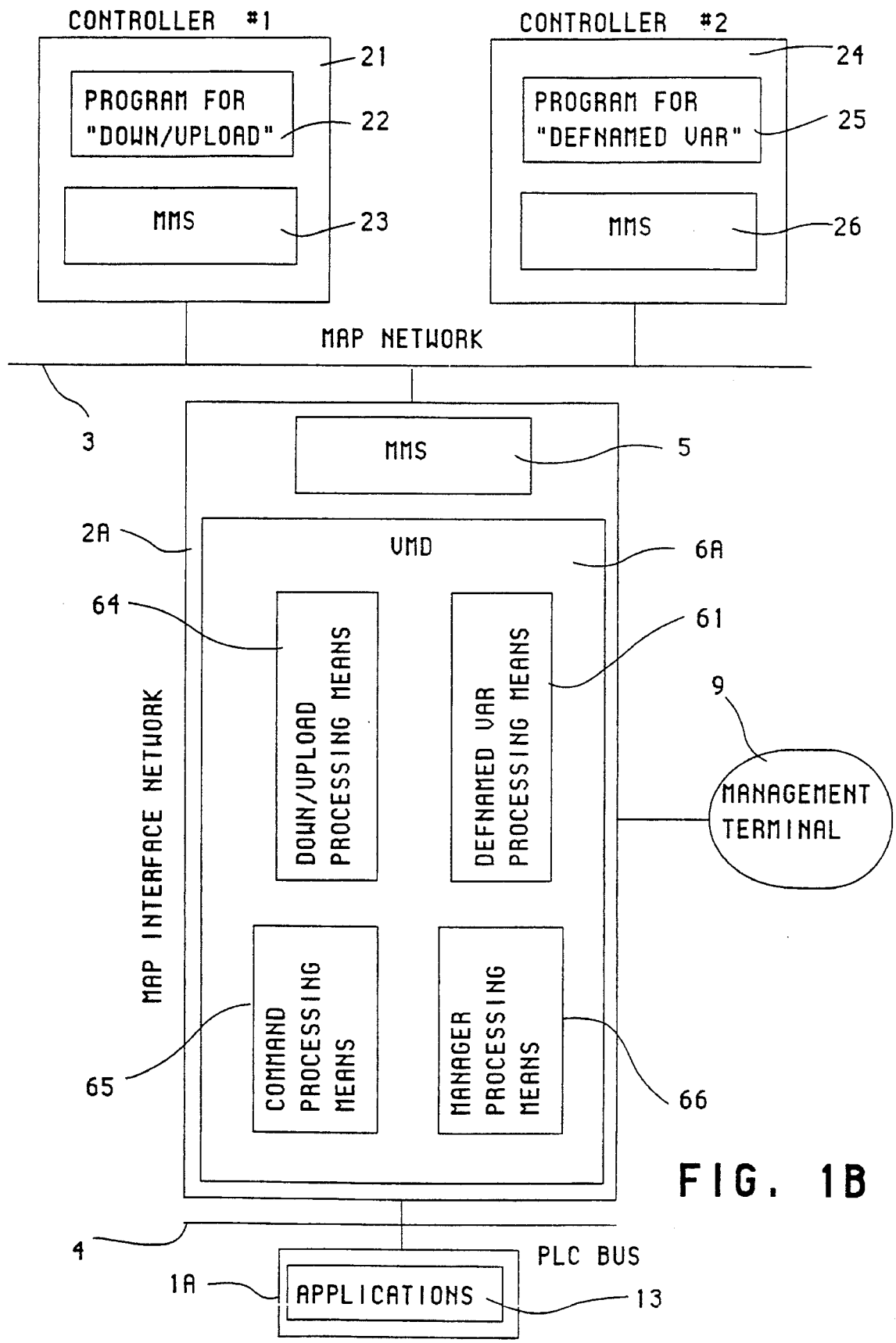
FIG. 1B is a system block diagram that illustrates the features of a the present invention in a multi-controller environment.

A description of first to third embodiments of the present invention will now be described in reference to FIG. 1A to FIG. 3B, wherein like reference characters designate like or corresponding parts throughout the several views.

FIG. 1A is a block diagram illustrating the configuration of a communication device in one station A, which employs a PLC (Programmable Logic Controller) as an example of an FA device and forms part of a local network of a plurality of stations B, C, etc. (not shown) defined to be at an "other end" of the network. Referring to FIG. 1A, the numeral 1A indicates a PLC as an FA device, 2A a MAP interface unit comprising a key component of the communication system, 6A a VMD (Virtual Manufacturing Device) for converting an MMS protocol 5 into a PLC-dedicated protocol and performing a process corresponding to each MMS service, and 9 a management terminal connected to the MAP interface unit 2A.

The PLC 1A has stored internally for use by its CPU an Upload Program/Download Program capability, as found in the conventional PLC, which is responsive to a command found in all conventional controllers and PLC's. In the present invention, this common command is used to remotely load the table 63. The identification of the MAP interface as the memory location of the table is accomplished by using an available parameter in the MSS standard.

An application 13, i.e., a program that uses the services of MMS in order to perform some job or work, is part of the PLC 1A. Within the MAP interface is a downloading/uploading means 64, representing programming and related hardware, for uploading to an other-end station a defined named variable that had been registered in a variable conversion table 63 and for downloading a named variable from an other-end station as an MMS service. A command processing means 65 also is provided for processing a command for defining a named variable that is input from the PLC 1A via a PLC-dedicated bus 4. Finally, a managing means 66 is provided for changing the variable conversion table locally.

The first embodiment of the invention defines a named variable by means of the Downloading/Uploading service ordinarily provided for the other-end station to transfer and load the domain content information from the MMS Client to the MMS Server. The service is applied by a station to register (store) the named variable in the variable conversion table 63 at the same station. In order to accomplish this function, the other-end station (not shown) is provided with a domain-type area in the List Of Capability attribute of an Initiate Download Sequence service. In the domain-type area, downloading is started in order to download the contents of the variable conversion table equipped for the other-end station; for example, the parameter "VARTABLE" is used to point to the MAP interface unit 2A serving as the communication device. A Download Segment service then causes the contents of the variable conversion table equipped for the other-end station, e.g., the contents of the table making a named variable "DATA001" correspond to a symbolic address "D1," to be downloaded and written to the variable conversion table 63 in the VMD 6A. In summary, using the parameter "VARTABLE" to get access to the table permits the named variable "DATA001" to be defined and registered as corresponding to the symbolic address "D1".

Every time a change is made to the contents of the variable conversion table 63 at the one station, the contents are uploaded to the variable conversion table of the other-end station where the defined named variables are stored. Since this storage is maintained irregardless of the operating condition of the one station, they may be downloaded to that station from the other end station when a power OFF condition is encountered and the power is switched on again. That is, the defined named variables can be kept stored even if the MAP interface unit 2A acting as the communication device does not include a storage device backed up by a battery, etc.

In the second embodiment of the invention, an application is used to activate the managing means 66 from the management terminal 9 via the local manager 8. The management terminal has a storage capability which permits registering of named variables. With this arrangement, the managing means 66 is made to register a named variable (e.g., DATA001) into the variable conversion table 63 in correspondence with a symbolic address "D1" and to write the registered named variable, if changed, to the management terminal 9. When a power outage condition is encountered and the power is switched on again, the defined named variables are kept stored since all the registered named variables are re-registered from the management terminal 9.

The third embodiment of the invention causes an application to register a named variable from the FA device 1A via the command processing means 65 into the variable conversion table 63 in correspondence with a symbolic address "D1" and to write the registered named variable, if changed, to the FA device 1A. When a power outage condition is encountered and the power is switched on again, the defined named variable is kept stored since all the registered named variables are re-registered from the FA device 1A.

Figure 2:
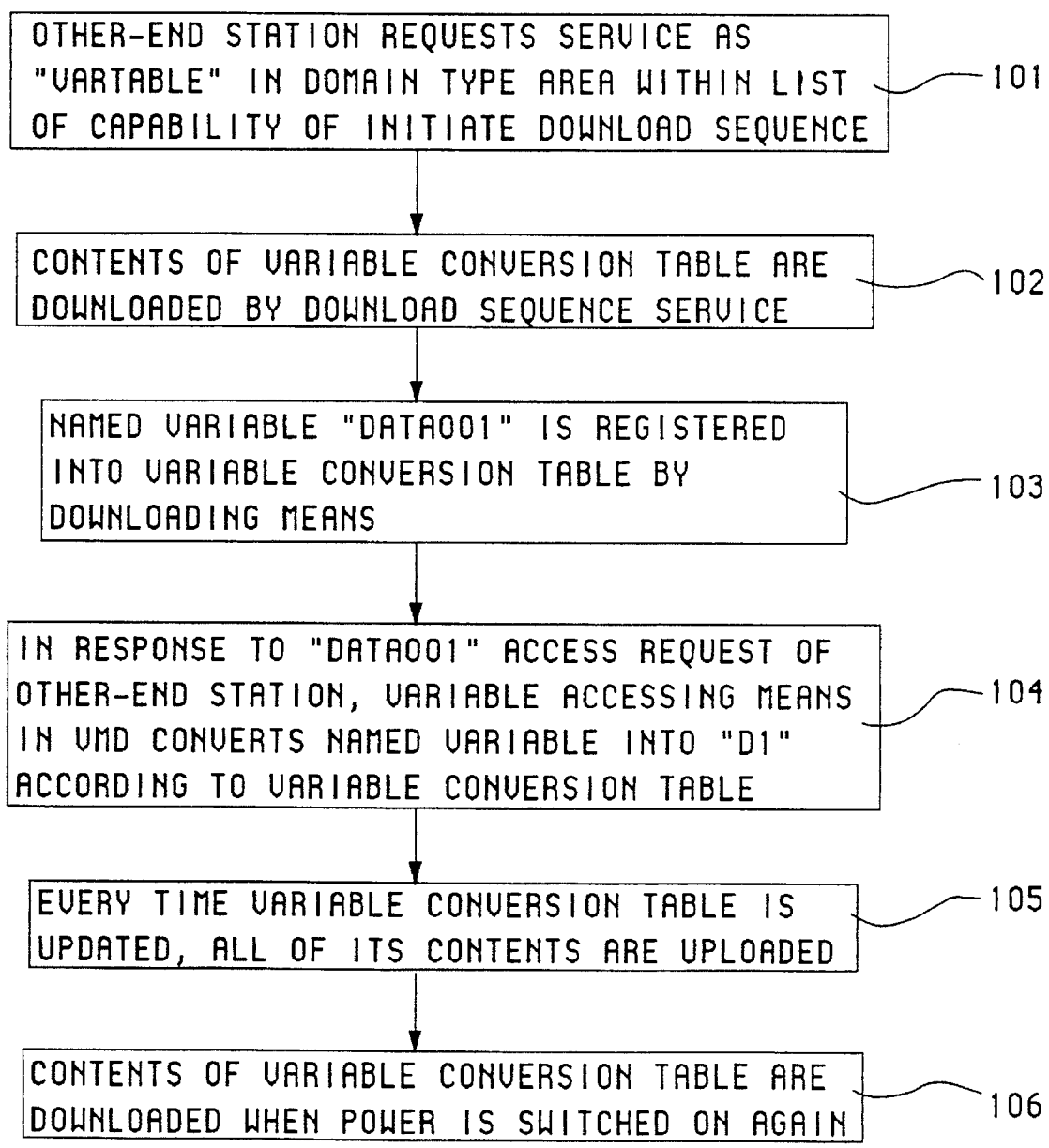
FIG. 2 is a flowchart showing the operation of the communication device according to the first invention.

FIG. 2 is a flowchart indicating the operation of the MAP interface unit 2A as the communication device shown in FIG. 1A. The flowchart illustrates the method by which a named variable is defined and is registered from the other-end station (not shown). The operation of the MAP interface unit 2A will now be described in accordance with FIG. 2.

First, it is assumed that the other-end station (not shown) has a domain-type area within the List Of Capability of the Initiate Download Sequence service. Second, it is assumed that the service may be requested as a parameter, for example "VARTABLE", in this domain type area in Step 101 in FIG. 2. As a result, the downloading/uploading means 64 causes the contents of the table included in the other-end station, e.g., data having made the named variable "DATA001" correspond to the symbolic address "D1," to be downloaded from the other-end station according to the Download Segment service in Step 102. Further, the downloaded contents of the table included in other-end station are then registered into the variable conversion table 63 of the one station, in Step 103.

In Step 104, when a named variable "DATA001" access request is then given from the other-end station, the variable accessing means 62 in the VMD 6A converts the named variable into the symbolic address variable "D1" that is specific to the FA device 1A employing the variable conversion table 63. Moreover, the VMD 6A can access the PLC 1A via the PLC driver 7.

Every time a change is made to the registered contents of the variable conversion table 63, all the registered contents of the variable conversion table 63 are uploaded to the other-end station by the downloading/uploading means 64 in Step 105. Further, the uploaded contents are downloaded to the variable conversion table 63 from the other-end station whenever a power outage condition is encountered and the power is switched on again, in Step 106, thereby keeping the defined named variables stored.

Figure 3A:
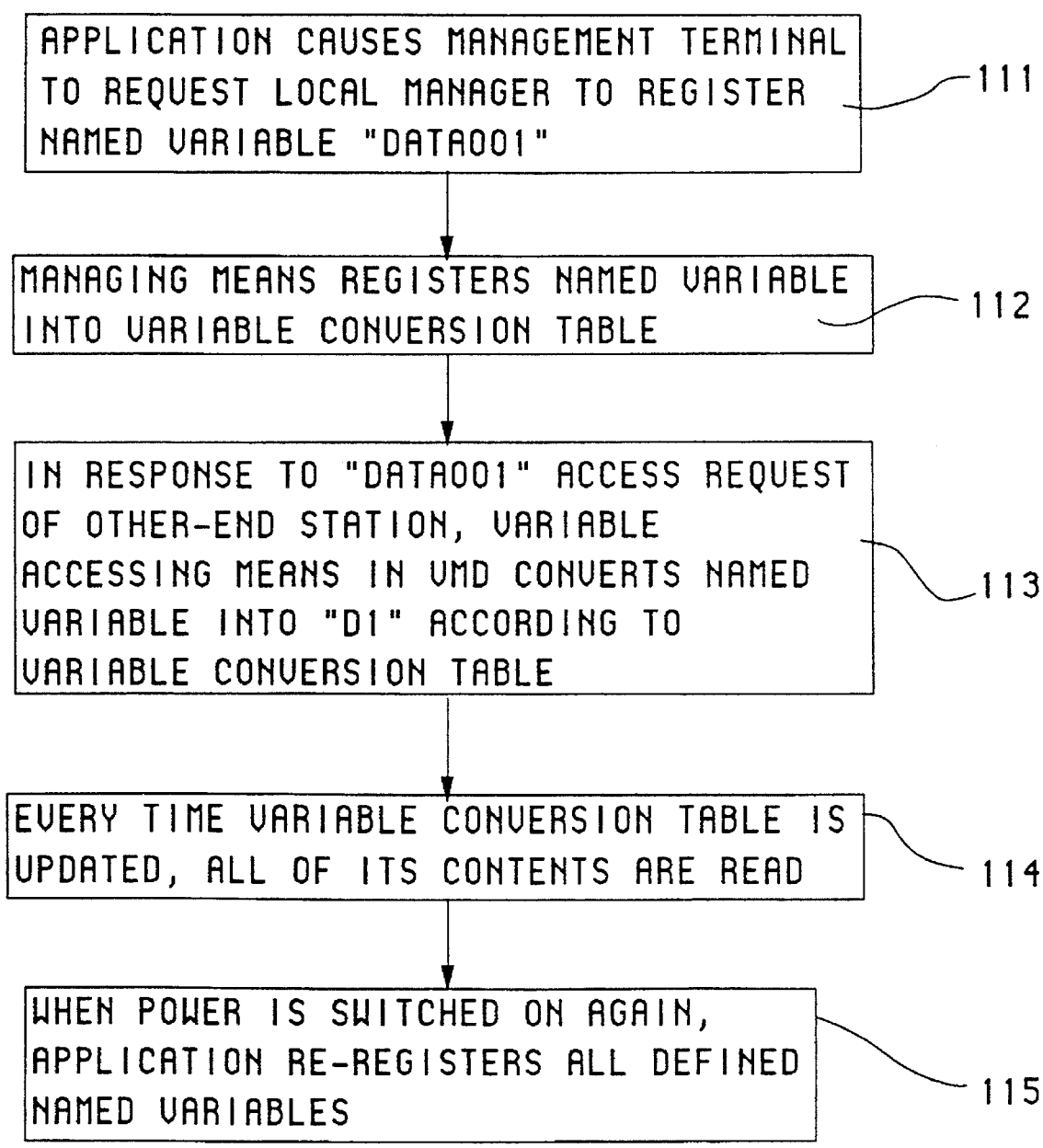
FIGS. 3A and 3B are flowcharts showing the operation of the communication device according to the second and third inventions.
Figure 3B:
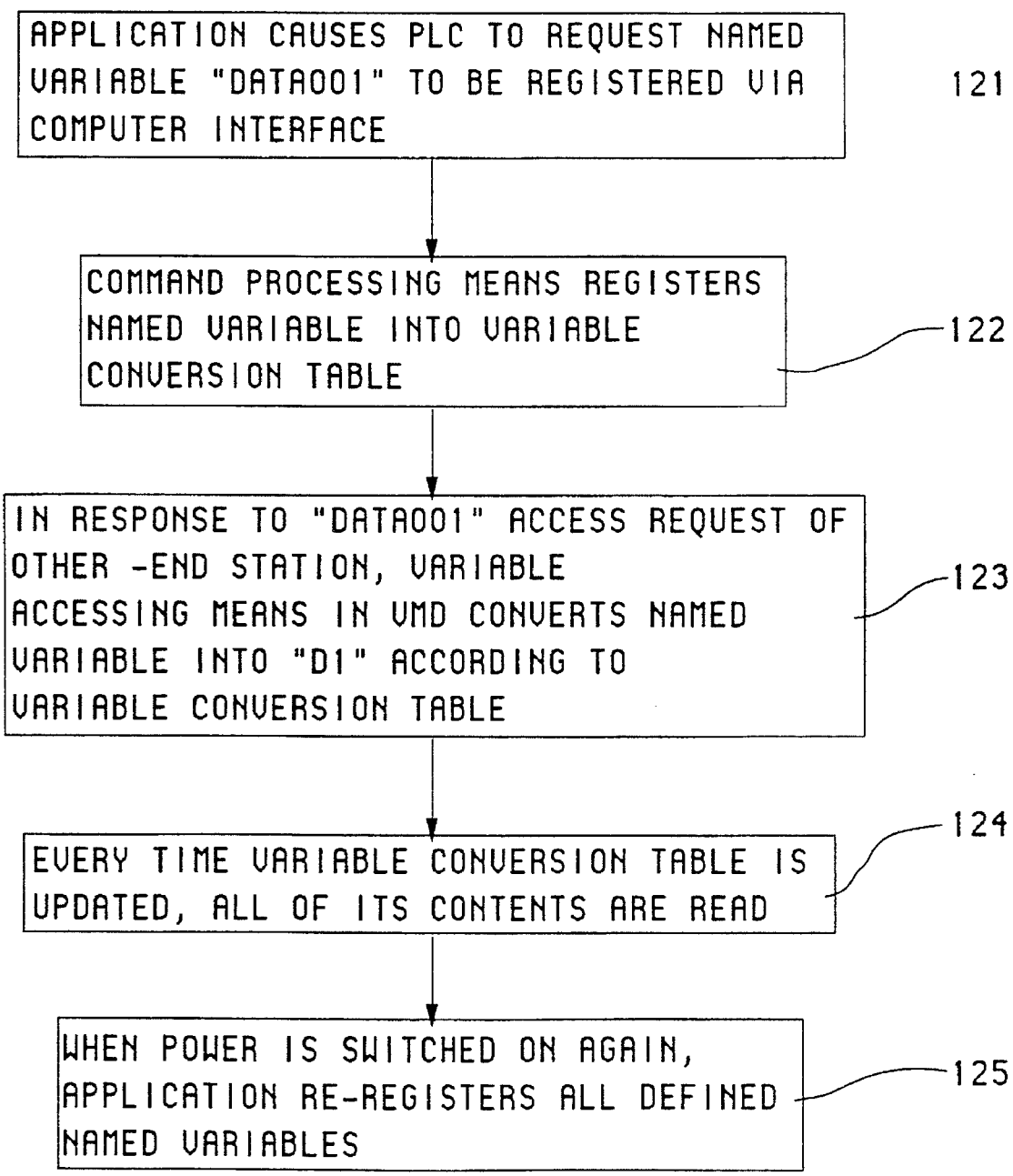
Figure 4A:
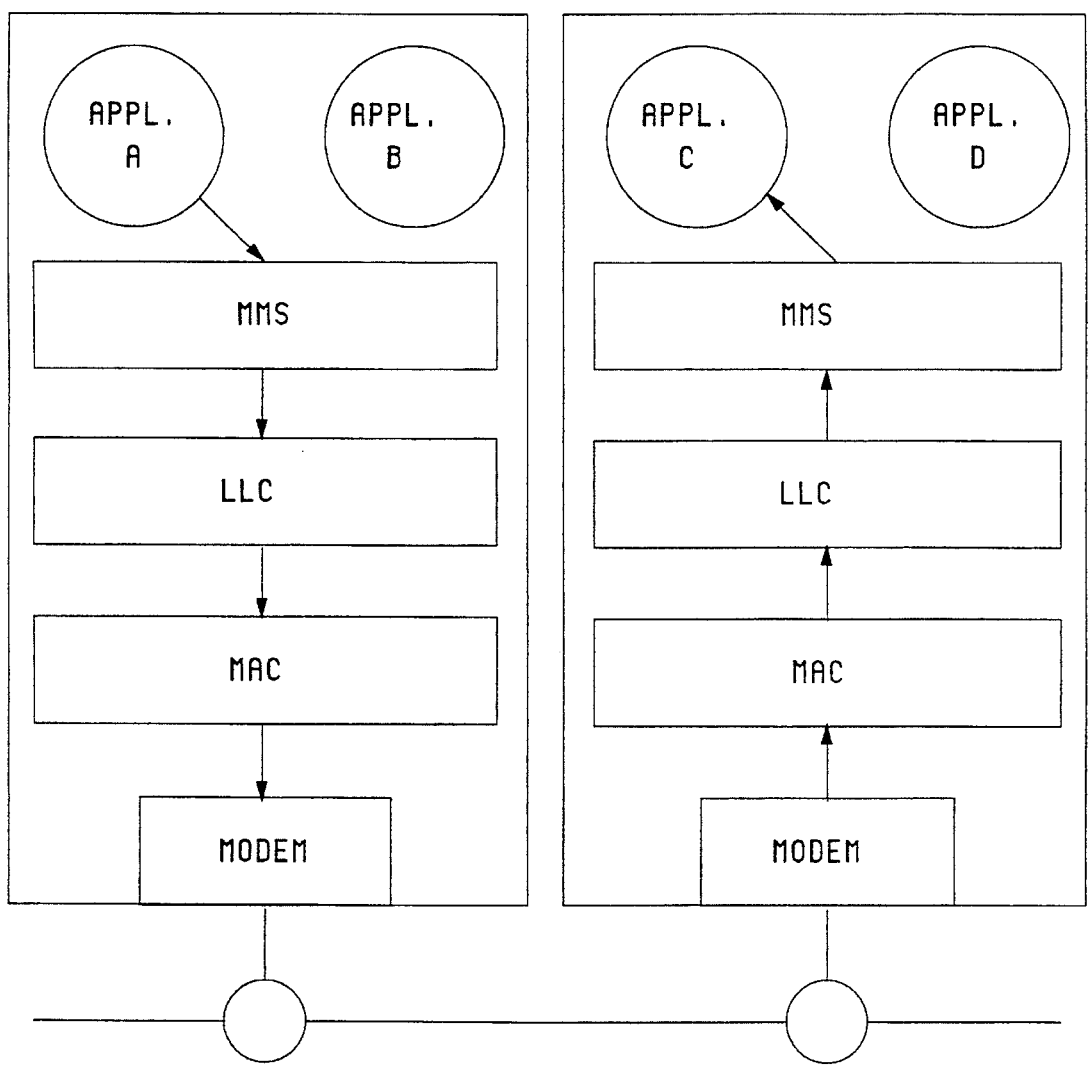
FIG. 4 is a block diagram of the environment for a local network having two stations that communicate via the MSS protocol and FIG. 4B is a block diagram outlining the arrangement of a communication device in each such station, as known in the art.
Figure 4B:
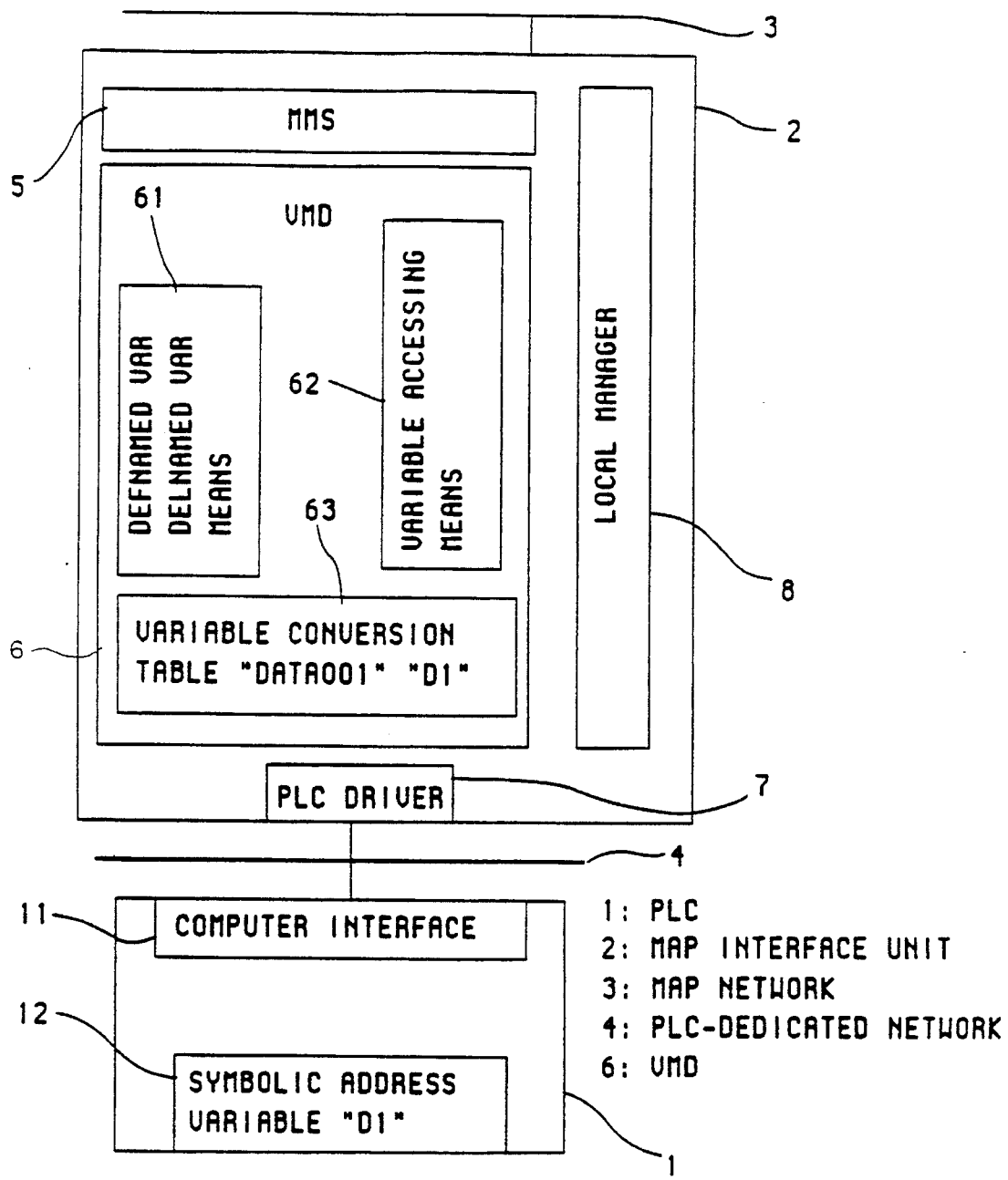
Figure 5:
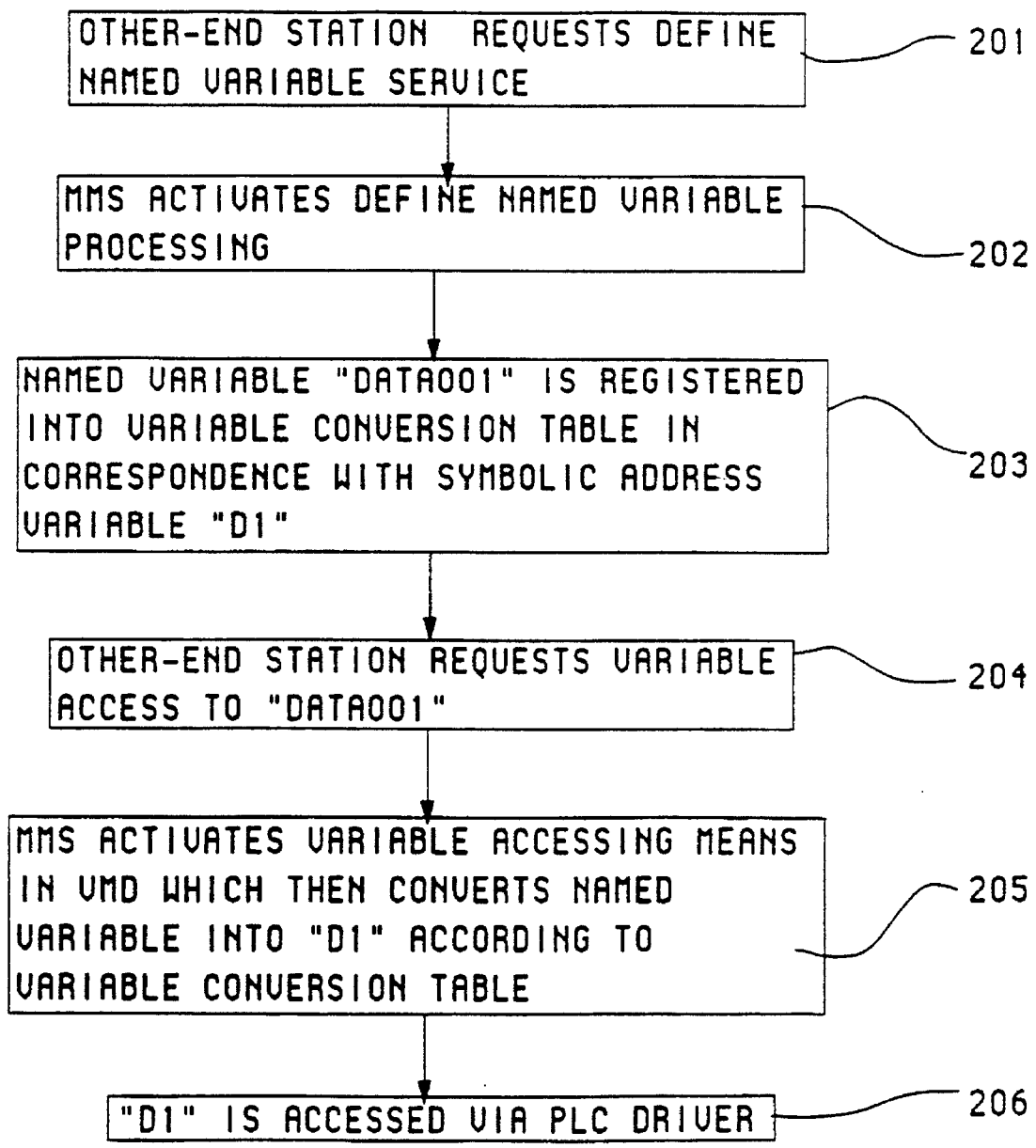
FIG. 5 is a flowchart showing the operation of the communication device illustrated in FIG. 4B.

FIGS. 3A and 3B also are flowcharts indicating the operation of the MAP interface unit 2A as the communication device shown in FIG. 1A, for the second and third embodiments. FIG. 3A and FIG. 3B describe how a named variable is defined, registered and kept stored from the management terminal 9 and FA device 1A, respectively. The operation of the MAP interface unit 2A will now be described in reference to FIG. 3A and FIG. 3B.

In FIG. 3A, when the application causes the management terminal 9 to request the local manager 8 to register the named variable "DATA001" in Step 111, the local manager 8 activates the managing means 66 in the VMD 6A, and the managing means 66 registers "DATA0001" into the variable conversion table 63 in correspondence with the symbolic address variable "D1" in Step 112. When the other-end station then gives a "DATA001" access request in Step 113, the variable accessing means 62 in the VMD 6A converts the named variable into "D1" according to the variable conversion table 63 and the VMD 6A accesses the PLC 1A via the PLC driver 7.

Further, every time a change is made to the contents of the variable conversion table 63, the managing means 66 and local manager 8 writes all the contents of the variable conversion table 63 to the management terminal 9 and store them there in Step 114. Therefore, following a power outage condition, when the power is switched on again, the application re-registers all the registered named variables in Step 115. That is, if any change is made to the contents of the variable conversion table 63 including those defined and registered by the Define Named Variable/Delete Named Variable means 61, etc., all the contents can be written to the management terminal 9 and stored into storage (not shown) at the management terminal 9. In this manner, the named variables defined are always kept stored.

Referring now to FIG. 3B, when the application 13 causes the PLC 1A to request the command processing means 65 in the VMD 6A to register the named variable "DATA001" in Step 121, the command processing means 65 registers "DATA0001" into the variable conversion table 63 in correspondence with the symbolic address variable "D1" in Step 122. When the other-end station then gives a "DATA001" access request in Step 123, the variable accessing means 62 in the VMD 6A converts the named variable into "D1" according to the variable conversion table 63 and the VMD 6A accesses the PLC 1A via the PLC driver 7.

Further, every time a change is made to the contents of the variable conversion table 63, the command processing means 65 writes all the contents of the variable conversion table 63 to the PLC 1A via the PLC driver 7 and computer interface 13 in Step 124, and after a power outage condition, when the power is switched on again, the application 13 re-registers all the registered named variables from the PLC 1A in Step 125. Namely, if any change is made to the contents of the variable conversion table 63 including those defined and registered by the Define Named Variable/Delete Named Variable means 61, etc., all the contents can be read to the PLC 1A and stored into storing means (not shown) provided for the PLC 1A. In this way, the named variables defined are kept stored.

It will be appreciated that the PLC employed as the FA device in this embodiment may be a numerical control unit, robot or other FA device.

In FIG. 1B, Define Named Variable/Delete Named Variable processing means 61 is seen in VMD 6A of the MAP interface unit 2A of the present invention. If a program for Define Named Variable/Delete Named Variable is implemented in one controller (e.g., in case of controller #2) but it is not implemented for the other controller (e.g., controller #1) as is usually the case, the one program can be used to define Named Variables in the MAP interface unit 2A of the PLC 1A, in accordance with the present invention.

If a program for Define Named Variable/Delete Named Variable is not implemented and a program for Download/Upload is implemented in a controller (in the case of controller #1, Download/Upload is usually implemented for many controllers), the one program may be used to define Named Variables in the MAP interface unit 2A of the PLC 1A.

In accordance with the present invention, the means of VMD 6A, such as the Define Named Variable/Delete Named Variable processing means 61, the Download/Upload processing means 64, the command processing means 65 and the manager processing means 66 can be used selectively by different controllers, PLC applications and Management terminals.

The entire disclosure of each and every foreign patent application from which the benefit of foreign priority has been claimed in the present application is incorporated herein by reference, as if fully set forth.

Although this invention has been described in at least one preferred form with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A communication device for use in a manufacturing automation protocol network comprising at least a first and a second station, said communication device being operative with said first station, coupled to said second station via said manufacturing automation protocol network, and coupled to a factory automation device having a vendor-defined symbolic address variable which enables said second station to use a user-defined named variable to access said factory automation device, said communication device comprising:

a manufacturing message specification protocol comprising a downloading service and communicating said user-defined named variable between said first station and said second station;

a virtual manufacturing device which converts said manufacturing message specification protocol into a protocol dedicated to said factory automation device, said virtual manufacturing device comprising a variable conversion table; and a downloading/uploading device, operative in response to said downloading service of said manufacturing message specification protocol, which downloads from said second station contents of a variable conversion table of said second station in which said user-defined named variable is defined as corresponding to a symbolic address variable specific to said factory automation device, which registers said contents into said variable conversion table of said virtual manufacturing device, and which uploads to said second station said contents registered in said variable conversion table of said virtual manufacturing device; and wherein said downloading/uploading device provides said user-defined named variable from said second station to said first station upon implementation of a power on condition.

2. A communication device for use in a manufacturing automation protocol network comprising at least a first and a second station, said communication device being operative with said first station, coupled to said second station via said manufacturing automation protocol network, and coupled to a factory automation device having a vendor-defined symbolic address variable which enables said second station to use a user-defined named variable to access said factory automation device, said communication device comprising:

a manufacturing message specification protocol comprising a downloading service and communicating said user-defined named variable between said first station and said second station;

a virtual manufacturing device which converts said manufacturing message specification protocol into a protocol dedicated to said factory automation device, said virtual manufacturing device comprising a variable conversion table; and a management terminal which defines said user defined named variable as corresponding to a symbolic address variable specific to said factory automation device and instructs registration of said user-defined named variable in said table;

wherein said virtual manufacturing device further comprises a managing device which registers said user-defined named variable into said variable conversion table in response to an instruction from said management terminal and which provides to said management terminal said user-defined named variable registered in said variable conversion table; and wherein said management terminal causes said user-defined named variable to remain stored re-registerably upon implementation of a power on condition.

3. A communication device for use in a manufacturing automation protocol network comprising at least a first and a second station, said communication device being operative with said first station, coupled to said second station via said manufacturing automation protocol network, and coupled to a factory automation device having a vendor-defined symbolic address variable which enables said second station to access said factory automation device by using a user-defined named variable, said communication device comprising:

a virtual manufacturing device for converting a manufacturing message specification protocol, which communicates said user-defined named variable between said first station and said second station, into a protocol dedicated to said factory automation device, said virtual manufacturing device including a variable conversion table; and a command processing device which registers said user-defined named variable into said variable conversion table as corresponding to a symbolic address variable specific to said factory automation device in response to a command input from said factory automation device and providing to said factory automation device said user-defined named variable registered in said variable conversion table; and wherein said factory automation device causes said user-defined named variable to remain stored re-registerably upon implementation of a power on condition.

4. A factory automation manufacturing system comprising:

a manufacturing automation protocol network for communicating within a factory automation environment;

a plurality of stations, each said station being communicatively coupled to said manufacturing automation protocol network, at least a first and a second of said stations being operative to communicate with each other via said manufacturing automation protocol network, at least said first station comprising a communication device coupled to a factory automation device having a vendor-defined symbolic address variable which enables said second station to use a user-defined named variable to access said factory automation device, said communication device at said first station comprising:

(a) a manufacturing message specification protocol comprising a downloading service and communicating said user-defined named variable between said first station and said second station;

(b) a virtual manufacturing device which converts said manufacturing message specification protocol into a protocol dedicated to said factory automation device, said virtual manufacturing device comprising a variable conversion table; and (c) a downloading/uploading device, operative in response to said downloading service of said manufacturing message specification protocol, which downloads from said second station contents of a variable conversion table of said second station in which said user-defined named variable is defined at said second station as a symbolic address variable specific to said factory automation device, which registers said contents into said variable conversion table of said virtual manufacturing device, and which uploads to said second station said contents registered in said variable conversion table of said virtual manufacturing device; and wherein said downloading/uploading device provides said contents from said second station to said first station upon implementation of a power on condition.

5. A network as claimed in claim 4, wherein said user-defined named variable is defined without using a define-said-user-defined-named-variable service in said second station.

6. A network as claimed in claim 4, wherein said plurality of stations further comprises a third station operative to communicate with said first station via said manufacturing automation protocol network and comprising a define-another-user-defined-named-variable service, and wherein said communication device at said first station further comprises a define-said-another-user-defined-named-variable device which accesses said factory automation device from said third station using said another user-defined named variable.

7. A network as defined in claim 6, wherein said second and third stations each comprise controllers.

8. A method of communicating within a factory automation system comprising a manufacturing automation protocol network and at least a first and a second station connected to said manufacturing automation protocol network for communication therebetween in accordance with a manufacturing message specification protocol, said first station being connected with a factory automation device having a vendor-defined symbolic address variable for accessing said factory automation device from said second station using a user-defined named variable and having a virtual manufacturing device for converting said manufacturing message specification protocol into a protocol dedicated to said factory automation device, said virtual manufacturing device comprising a variable conversion table wherein said user-defined named variable is registered convertibly into a symbolic address variable specific to said factory automation device, comprising the step of:

defining and storing in said variable conversion table said user-defined named variable without using a define-said-user-defined-named-variable service in said manufacturing message specification protocol at said first station, comprising the steps of:
defining said user-defined named variable in a variable conversion table of said second station as corresponding to said symbolic address variable specific to said factory automation device;
downloading contents of said variable conversion table of said second station in which said user-defined named variable is defined as corresponding to said symbolic address variable to register said user-defined named variable in said variable conversion table;
uploading to said second station said user-defined named variable registered in said variable conversion table; and
downloading said named variable from said second station to said first station upon implementation of a power on condition.

9. The method of communicating within a factory automation system as claimed in claim 8, wherein said defining and storing step is performed in accordance with a download service obtained in response to a parameter input.

10. The method of communicating within a factory automation system as claimed in claim 9, wherein said parameter is used to access a domain-type area in an attribute of said download service.

11. A method of communicating within a factory automation system comprising a manufacturing automation protocol network and at least a first and a second station connected to said manufacturing automation protocol network for communication therebetween in accordance with a manufacturing message specification protocol, said first station being connected with a factory automation device having a vendor-defined symbolic address variable for accessing said factory automation device from said second station using a user-defined named variable and having a virtual manufacturing device for converting said manufacturing message specification protocol into a protocol dedicated to said factory automation device, said virtual manufacturing device comprising a variable conversion table wherein said user-defined named variable is registered convertibly into a symbolic address variable specific to said factory automation device, comprising the step of:

defining and storing in said variable conversion table said user-defined named variable without using a define-said-user-defined-named-variable service in said manufacturing message specification protocol at said first station, comprising the steps of:
defining said user-defined named variable from a management terminal as corresponding to a symbolic address variable specific to said factory automation device;
registering said user-defined named variable in said variable conversion table in response to a request from said management terminal;
reading to said management terminal said user-defined named variable registered in said variable conversion table; and
causing the user-defined named variable to remain stored re-registerably upon implementation of a power on condition.

12. A method of communicating within a factory automation system comprising a manufacturing automation protocol network and at least a first and a second station connected to said manufacturing automation protocol network for communication therebetween in accordance with a manufacturing message specification protocol, said first station being connected with a factory automation device having a vendor-defined symbolic address variable for accessing said factory automation device from said second station using a user-defined named variable and having a virtual manufacturing device for converting said manufacturing message specification protocol into a protocol dedicated to said factory automation device, said virtual manufacturing device comprising a variable conversion table wherein said user-defined named variable is registered convertibly into a symbolic address variable specific to said factory automation device, comprising the step of:

defining and storing in said variable conversion table said user-defined named variable without using a define-said-user-defined-named-variable service in said manufacturing message specification protocol at said first station, comprising the steps of:
generating a command at said factory automation device to input said user-defined named variable;
registering said user-defined named variable in said variable conversion table as corresponding to said vendor-defined symbolic address variable in response to a request from said factory automation device command;
providing to said factory automation device said user-defined named variable registered in said variable conversion table; and
causing said user-defined named variable to remain stored re-registerably upon implementation of a power on condition.

\* \* \* \* \*